United States Patent [19]
Ryan et al.

[11] 3,891,323
[45] June 24, 1975

[54] APPARATUS FOR DETECTING CHANGES IN THE ORIENTATION OF A MORTAR GUN TUBE

[75] Inventors: Maurice A. Ryan, Rock Island, Ill.; Morton A. Barron, Potomac, Md.

[73] Assignee: The United States of America as represented by the Secretary of the Army, Washington, D.C.

[22] Filed: Sept. 7, 1973

[21] Appl. No.: 395,119

[52] U.S. Cl. .................................. 356/154; 350/124
[51] Int. Cl.² ........................................ G01B 11/27
[58] Field of Search ....... 89/41 E; 33/233, 235, 286; 350/124; 356/138, 153, 154, 155, 172, 253, 254, 255

[56] References Cited
UNITED STATES PATENTS

| 2,388,203 | 10/1945 | Zindel | 350/124 |
|---|---|---|---|
| 3,321,248 | 5/1967 | Williamson et al. | 356/153 |
| 3,734,627 | 5/1973 | Edwards | 356/153 |

Primary Examiner—Stephen C. Bentley
Attorney, Agent, or Firm—Nathan Edelberg; Robert P. Gibson; Saul Elbaum

[57]      ABSTRACT

Disclosed is an apparatus for detecting and correcting changes in the orientation of a gun tube after firing. The apparatus is comprised essentially of a collimated light source, an image screen, and a reflector mirror. Either the light or reflector mirror is mounted on the gun tube. Provided the mirror is mounted on the gun tube, an image from the mirror is focused upon the screen and compared with the light source position or position of the transmitted image therefrom. Provided the apparatus is set up such that the reflected and transmitted images initially coincide, changes in the orientation of the gun tube may be detected and corrected. The light reflected from the mirror on the gun tube is focused on the screen which is located in front of the gun tube. Any movement of the mortar tube may be detected by optical observation of the position of the reflected beam. The orientation of the gun tube may be corrected by moving it such that the reflected beam again coincides with the image of the light source. An essential element of the invention is a screen which is a composite transparent, translucent, and opaque structure which also has a grid member thereon to prevent reflection of sunlight therefrom. Several alternative embodiments are described wherein the mirror, screen, and light source positions are interchanged and the mirror is modified in order to extend the travel path of the transmitted light beam.

8 Claims, 10 Drawing Figures

PATENTED JUN 24 1975 3,891,323
SHEET 1
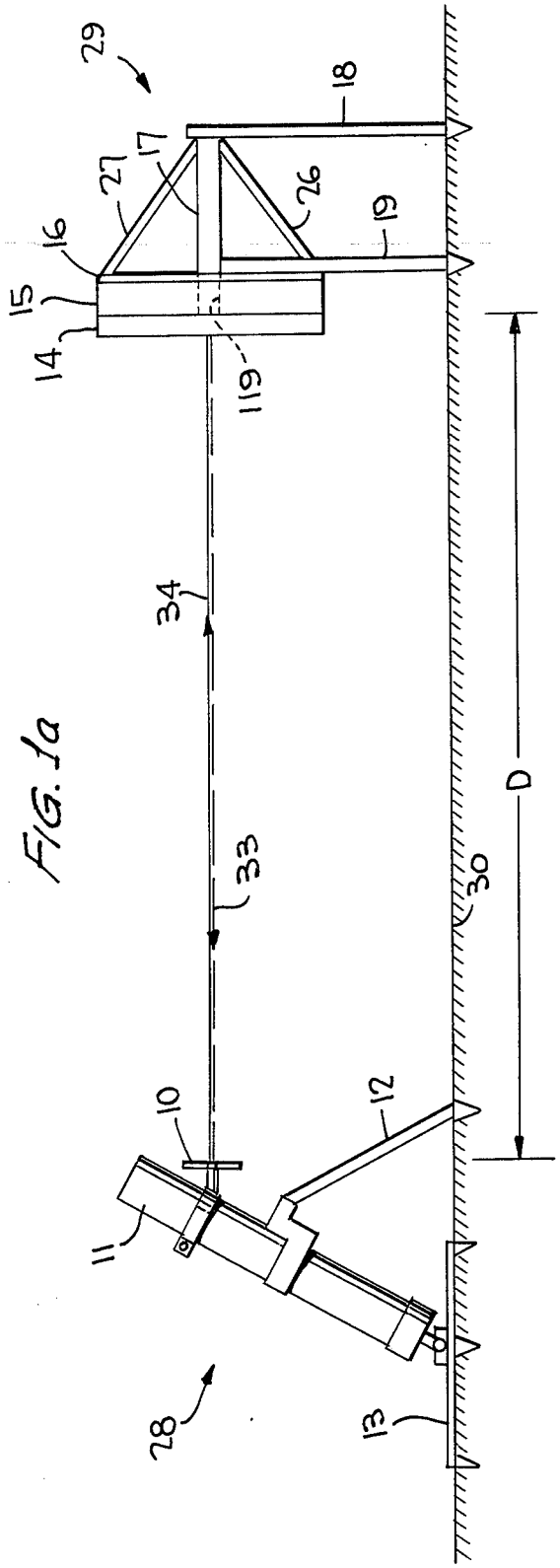
FIG. 1a
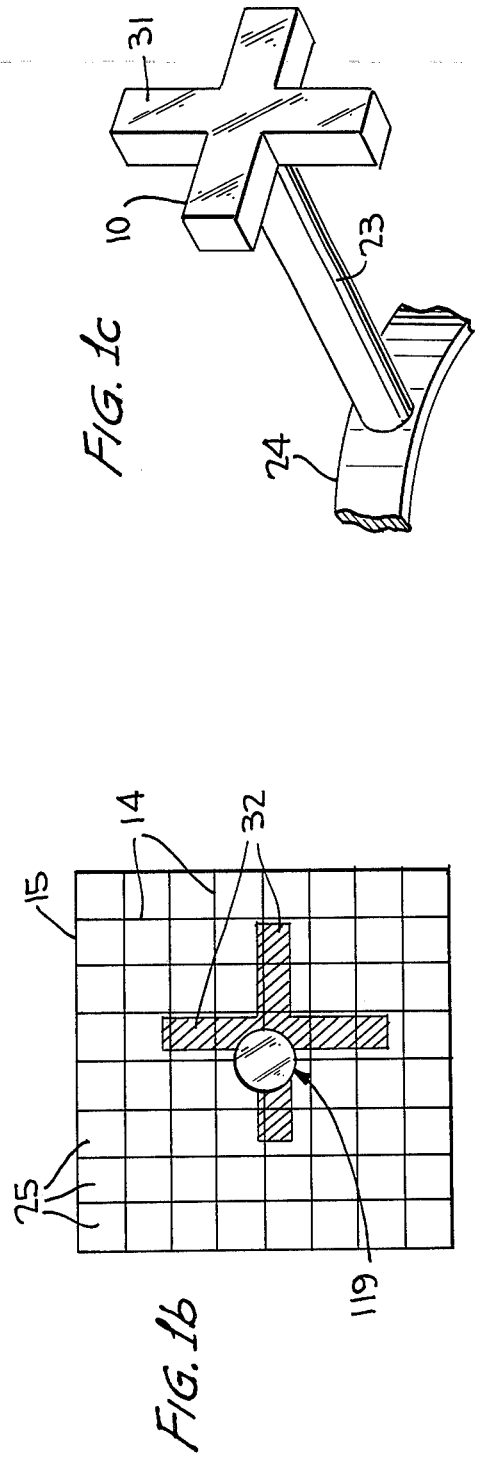
FIG. 1c
FIG. 1b 3,891,323

3,891,323

APPARATUS FOR DETECTING CHANGES IN THE ORIENTATION OF A MORTAR GUN TUBE

RIGHTS OF THE GOVERNMENT

The invention described herein may be manufactured, used, or licensed by or for the United States Government for governmental purposes without the payment to the inventor of any royalty thereon.

BACKGROUND OF THE INVENTION

1. FIELD OF THE INVENTION

The invention herein is related specifically to the problem of detecting and changing the orientation of the firing tube of a mortar and being able to correct this change.

2. DESCRIPTION OF THE PRIOR ART

The mortar is historically the weapon for concentrating fire in a particular area. It is usually intended to fire in the general direction of a target and fire often enough to cause injury to the target. However, the mortarmen desire to come as close to the true target as possible without adding undo cost, weight, complexity or reaction time to the mortar. Over generations, better aiming procedures have been developed and more stable tubes, base plates, and ammunition have been developed to improve the mortar's precision.

Heretofore, in order to detect changes in the orientation and provide adjustments therefor telescopic sights with vernier adjustments, aiming stakes, precision surveying equipment (aiming circles), spirit levels, and careful laying procedures have been incorporated into techniques for firing mortars. There are many significant drawbacks to the telescopic aiming stake system and other related systems. In such systems a mortarman must implace stakes about 100 meters from the mortar tube and an inner stake must be placed approximately halfway between the mortar tube and the outer stake. Moreover, when a movement in the mortar tube occurs the mortarman generally has to guess at the correction with respect to the stakes. Because of the intricacy of the telescopic system it is used only to spot check tube alignment during missions and it is impossible for use when rapid firing is necessitated.

Another generically related device is comprised of a cylindrical shaft having 25 percent of its surface longitudinally mirrored and using a laser diode mounted in a telescope to reflect an image therefrom. The telescope is mounted on the gun barrel and picks up the reflected beam. Any movement of the gun azimuthally may be corrected by adjusting the gun until the telescope is again aimed such that the beam appears therein at the same spot. The significant problem involved in the use of this apparatus is that only azimuthal or horizontal changes in the orientation of the gun tube may be detected and corrected. Azimuthal changes are detected by implanting the stake vertically in the ground and horizontal changes are detected by laying the stake flat on the ground. In both cases the 25% longitudinal mirror is oriented such that a reflection is obtained toward the telescope mounted on the mortar tube.

A major problem arises with this system when there is a shift in the orientation of the mortar tube such that the transmitted beam from the laser diode does not fall on either a horizontal stake or a vertically placed stake. A mortar man may detect that the orientation of the tube has changed but he does not learn the degree of such change and the degree of correction needed in order to reorient the mortar tube.

It is accordingly an object of this invention to provide a new and novel apparatus for detecting and correcting any orientation change of a mortar tube.

It is another object of this invention to provide a new and novel apparatus which is operable without regard to the position and orientation of the sun overhead.

It is still another object of this invention to provide an apparatus for detecting and correcting changes in orientation of a mortar gun tube at maximum rates of fire for said tube.

It is yet another additional object of this invention to provide a new and novel apparatus for detecting and correcting changes in the orientation of a mortar gun tube whereby small angular errors may be amplified into significant linear errors by projection of the angular error for a long distance without the necessity of placing the apparatus over a large area.

It is yet an additional further object of this invention to provide an apparatus for detecting and correcting changes in the orientation of a mortar gun tube using the human eye.

These and other objects of the present invention will become more fully apparent with reference to the following specifications and drawings which relate to several preferred embodiments of the present invention.

SUMMARY OF THE INVENTION

The invention is an apparatus for detecting and correcting orientation of a mortar gun barrel mounted in the earth and comprises a light source for emitting a beam of light which is reflected from a mirror or other reflecting surface mounted on the gun barrel. The reflected beam is focused on a screen some distance away from the mirror and proximate to the source of light. Basically, an observer located proximate to the mortar gun barrel can detect any changes in orientation of the gun barrel and correct accordingly by observation of the position of the focused light beam at the screen. The screen is specially designed such that the observer at the mortar gun barrel is not encumbered from the use of the apparatus by reflected sunlight. This is accomplished by a thick grid comprised mainly of holes appositioned to the screen. The design of the screen is such that it enables light from the light source to pass through it without refraction and is also comprised of translucent material such that the reflected beam may be focused thereupon.

BRIEF DESCRIPTION OF THE DRAWINGS

The specific nature of the invention as well as other objects, aspects, uses, and advantages thereof will clearly appear from the following description and from the accompanying drawings, in which:

FIG. 1a is a drawing of a first embodiment of the invention.

FIG. 1b is a drawing of the screen used in the invention with the image of the reflected beam focused thereon.

FIG. 1c is a drawing of the reflector.

FIG. 2c is a cutaway top view of the mirror box along line 2c shown in FIG. 2a.

DESCRIPTION OF THE PREFERRED EMBODIMENTS

Figure 2A:
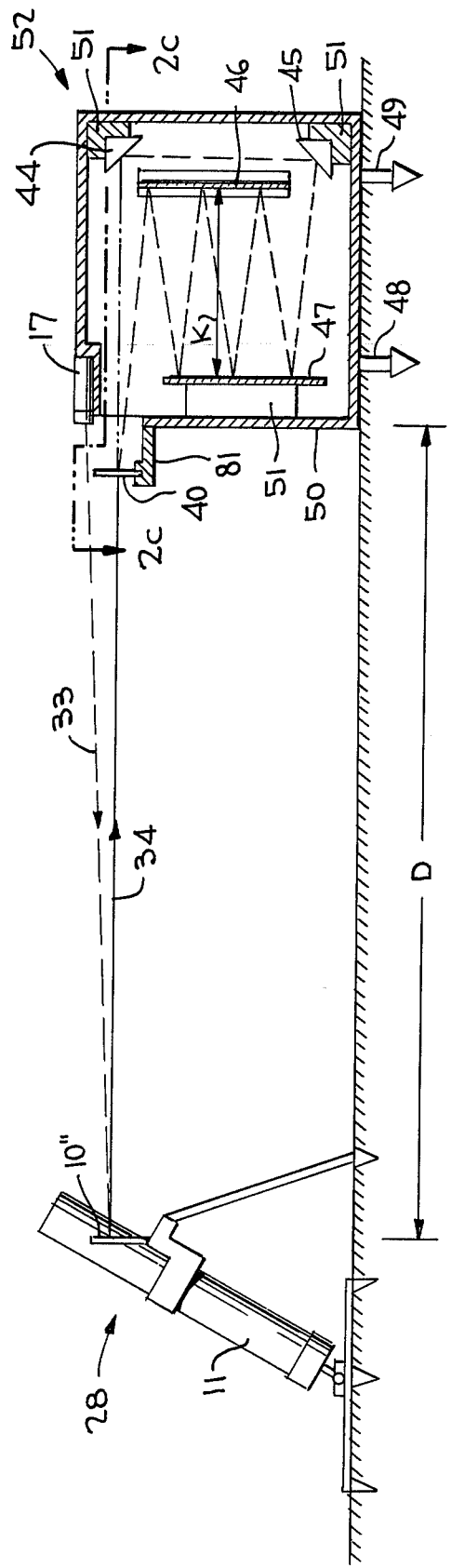
FIG. 2a is a drawing of a second embodiment of the invention using a mirror box to extend the travel path of the reflected beam.

The invention will be understood with respect to a first preferred embodiment by reference to FIG. 1a wherein there is shown a mortar mounted in the earth with a screen and light source assembly directly in front a distance D away. Generally, a mortar is comprised of a firing tube 11, pod member 12, and base plate 13. The pod member 12 and base plate 13 are mounted in the earth 30. Bracketed to the firing tube 11 is reflecting surface 10. The screen and light source assembly shown generally at 29 is mounted directly in front of the mortar 28 by stakes 18 and 19 driven into the earth 30. The particular screen and light source assembly has rigid structural brackets 26 and 27 attached to the screen 15. The screen 15 has an aperture 119 therein for the purpose of permitting light from the light source 17 to pass through. A grid structure 14 is appositioned to the surface of the screen. The grid structure 14 is attached by means of glue. The grids of the grid structure 14 have a length approximately equal to one fourth of the thickness of the structure 14. These individual grids of the structure 14 are illustrated generally in FIG. 1b at 25.

In FIG. 1b is shown an illustration of the screen 15. The screen 15 has an aperture 119 therein for the purpose of permitting light to pass through from light source 17. The honeycomb structure 14 is for the purpose of preventing sunlight from being reflected from or shining on screen 15. Shown on the screen for the purpose of illustration is image 32 of the shape of the reflecting member 10. This is the appearance of the reflected beam from the reflecting surface 10 mounted on the mortar firing tube 11 (shown in FIG. 1a).

In FIG. 1c is shown a detailed illustration of the reflecting member 10. The reflecting member 10 has a polished reflecting surface 31 and is comprised mainly of polished steel. The polished steel cross member 10 is attached to a stalk 23 which is attached to a bracket member 24. Bracket member 24 is used for the purpose of attaching the reflecting structure 10 to the firing tube 11.

After several firings from the mortar, depicted generally at 28 in FIG. 1a, the firing tube 11 will move from its original position with respect to the earth 30. The apparatus of the invention enables a mortarman located near the mortar 28 to detect this change in orientation. The light source 17 of the apparatus emits a light beam 33 which impinges upon the reflecting member 10. This reflecting member 10 causes a light beam in the shape of a cross to be reflected therefrom toward the screen 15. When the apparatus is properly set up the reflecting structure 10 is adjusted such that the reflected beam 34 permits a focused image of the cross shape of the reflecting structure 10 to be shown on the screen 15 and centered there. Sunlight is prevented from interfering with the observation of this reflected beam by means of grid member 14. Hence, any movement of the firing tube 11 which results in a change in its orientation may be detected by observation of the position of the image of the reflected beam appearing on the screen 15. Accordingly, the mortarman by readjusting the orientation of the gun tube such that the cross is restored to its original position can correct for the change in orientation of the gun tube 11.

Shown generally in FIG. 2a is a second embodiment of the invention wherein the apparatus comprises an image screen and mirror box assembly shown generally at 52. Instead of permitting the light source 17 to shine through the image screen, in this particular case the light source impinges upon the cross-shaped reflecting member 10 off axis from the image screen 40. This particular embodiment gives great accuracy due to the extended travel distance of the reflected light beam.

Figure 2D:
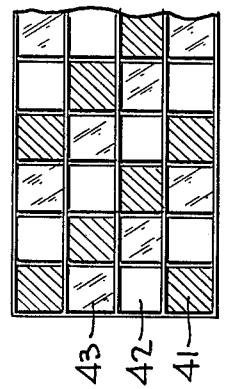
FIG. 2d is a front view of a specific embodiment of the image screen.

In order to understand the operation of the second embodiment fully it is necessary to understand the structure of the image screen 40 depicted in FIG. 2d. Referring to this figure, it is shown that the image screen is comprised of three different types of glass (the screen may also be comprised of similar materials other than glass). The screen is comprised of a mosaic of small blocks of clear glass, translucent glass, and opaque glass in equal numbers. For this particular embodiment the opaque glass is essentially plain glass painted white. The reason for this particular design for the image screen is that it is necessary in order for the invention to work properly to have a screen which is able to transmit, diffuse, and reflect light, simultaneously.

In operation, a light beam 33 is emitted from light source 17 and permitted to impinge upon reflecting structure 10. The reflecting structure 10 is aligned such that it reflects a beam of light 34 in the shape of a cross onto image screen 40. Because of the transparent property of image screen 40 a substantial portion of light beam 34 is permitted to pass through the image screen and impinge upon mirror 44. The light beam is reflected from mirror 44 at a 90° angle and permitted to impinge upon mirror 45 at a 45° angle. The beam is turned 90° by reflecting mirror 45 and permitted to impinge upon flat reflecting mirror 47. Flat reflecting mirror 47 has an opposing mirror 46 directly in front of it and separated by a discretionary distance K. After several reflections between mirrors 46 and 47 the light beam is permitted to emerge from mirror 46 and be reflected and focused onto image screen 40. Because of the translucent property of image screen 40 an observer or mortarman located at the mortar 28 will be able to observe this image. By comparison of the reflected image shown by the opaque portion of the image screen 40 with the transmitted and reflected image shown by the translucent portion of the image screen the mortarman can readily determine whether or not the orientation of the firing tube 11 of the mortar 28 has changed. If a change can be noticed the mortarman may readjust the orientation of the firing tube such that the reflected and transmitted beam coincide with the beam shown by the opaque portion of the screen.

Typically, the separation distance D between the mortar and imaging device, is 3 to 5 feet. The typical separation, $k$, between the multiple reflecting mirrors 46 and 47 is generally 6 inches to two feet. In this particular embodiment the separation $k$ is 18 inches. The blocks of glass used to make up the image screen are approximately 1/16 in.

Figure 2C:
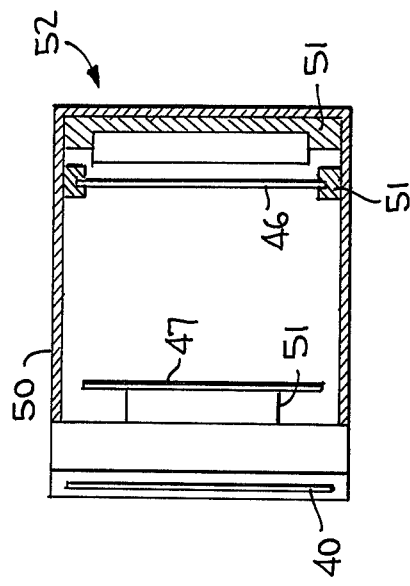
Figure 2B:
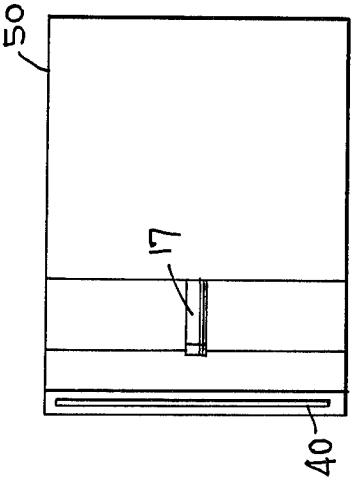
FIG. 2b is a top view of the mirror box.

The top view of the image screen mirror box shown in FIG. 2b illustrates the light source 17 mounted thereon and shows a top view of the image screen. In FIG. 2c is shown a top view of the mirror box 52 with the top panel having the light source attached removed. The mirrors comprising the box are contained within box member 50. The reflecting mirrors 44, 45, 46, and 47 are mounted to the box member 50 wall by means of attachment brackets 51.

Figure 3A:
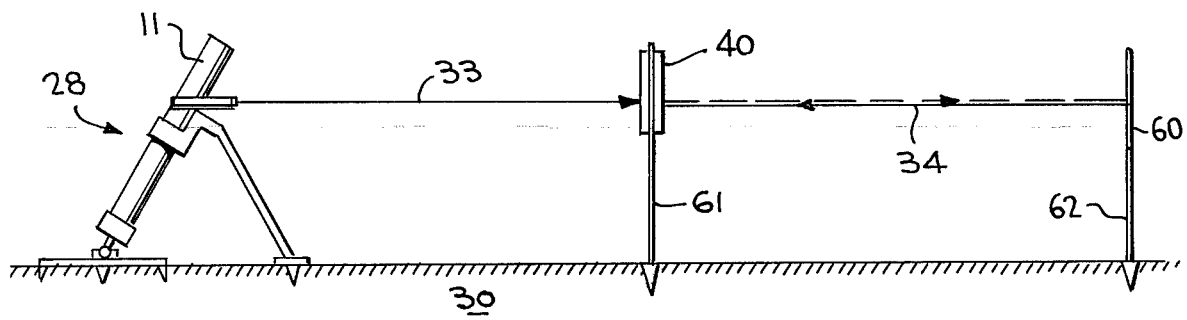
FIG. 3a is a drawing of a third embodiment of the invention using a light source mounted on the mortar gun barrel and an individual image screen and reflecting mirror both mounted in the earth.

In FIG. 3a is shown a third embodiment of the invention comprising a separate image screen, separate reflector mirror and a collimated light source attached to the mortar. In particular, the image screen 40 shown in detail in FIG. 2d is now attached to stake 61 mounted in the earth 30 a distance of 2 to 5 feet away from the mortar shown generally at 28. Approximately 5 feet behind the image screen and 7 to 10 feet away from the mortar 28 is a reflector mirror 60. Reflector mirror 60 is attached to stake 62 and the stake member is partially driven into the earth 30.

Figure 3B:
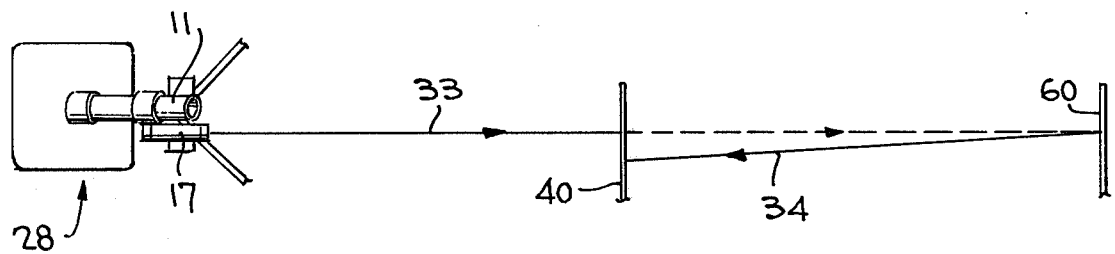
FIG. 3b is a top view of the drawing of FIG. 3c.

In order to fully understand the operation of this embodiment we refer to FIG. 3b wherein there is shown an emitted beam of light 33 from the light source 17. Light source 17 mounted on the mortars shown generally at 28 emits a collimated light beam 33 which impinges upon screen 40 at which a portion of the beam is permitted to pass and impinge upon reflector mirror 60. The stopped or unreflected portion of beam 33 appears on the screen 40 as an image of the light beam 33. A beam 34 is reflected from reflector mirror 60 and impinges upon the rear of image screen 40. Because of the translucent property of the image screen 40 an image of the reflected beam 34 appears thereon. An observer standing at the mortar 28 can readily observe whether or not the image of beam 34 and 33 coincide. If initially the two beam images coincided any misalignment of the images is due to movement of the light source 17 by a change in orientation of the firing tube 11 with respect to the earth.

Figure 4:
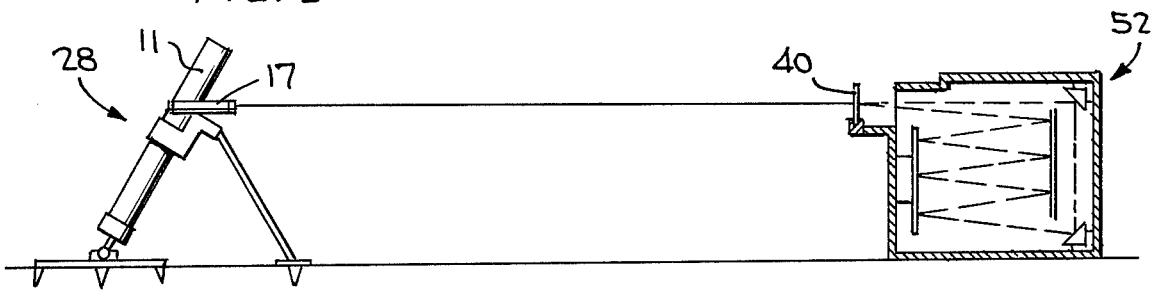
FIG. 4 is a drawing of a fourth embodiment of the invention using a combined image screen and mirror box.

In FIG. 4 is shown a fourth embodiment of the invention which is essentially that of FIG. 2a. In FIG. 4 the mirror structure 10 of FIG. 2a has been replaced by collimated light source 17.

It is to be understood that the light source used herein need only be substantially collimated. However a laser is an ideal light source for this invention.

The apparatus of this invention is considered to be properly aligned when in the case of a light source mounted on the gun barrel, the image screen and reflector mirror are orthogonal to the central principle axis of the light beam. In the particular embodiment of the apparatus wherein the light source is mounted on the mirror box (FIG. 2a), the apparatus is considered to be properly aligned when an image formed on the surface of the screen nearest the mortar tube coincides with an image originating from a beam coming from within the mirror box.

In the embodiments presented herein the grid structure for preventing the reflection of sunlight is made of aluminum and it is painted black or anodized such that it appears black.

In the embodiments herein presented it is also to be noted that the opaque portion of the image screen may be comprised of frosted glass having a mirror backing. This particular embodiment for the opaque blocks of the image screen is desirable because it has been found that it permits the use of a lower intensity beam. The mirror backing on the frosted glass serves to increase the intensity of the image formed thereon.

It is to be understood that the inventor does not desire to be limited to the exact details of construction shown and described for obvious modifications will occur to a person skilled in the art.

What is claimed is:

1. Apparatus for detecting and correcting orientation of a gun barrel mounted in the earth comprising:
    first means mounted in the earth for emitting a beam of light;
    second means mounted in the earth comprised of a screen having a front and back surface having clear, translucent and opaque portions for
    showing a first portion of the emitted beam by reflecting from the front surface of said screen the portion of the emitted beam impinging upon said opaque portion,
    permitting a second portion of the emitted beam to pass through said clear portion after which said second portion undergoes at least one change of direction and is finally directed to the back surface of said screen,
    showing the second portion of the emitted beam on said translucent portion of said screen
    third means attached to said screen for avoiding reflection of sunlight 2. Apparatus in accordance with claim 1 wherein said first means comprises means for emitting a beam of light and means for reflecting said beam of light.

3. Apparatus in accordance with claim 2 wherein said emitting means is a substantially collimated light source.

4. Apparatus in accordance with claim 3, wherein said reflecting means is a mirror.

5. Apparatus in accordance with claim 4 wherein said screen is located orthogonal to said emitted beam and located the same distance away from said mirror as said light source.

6. Apparatus in accordance with claim 5 wherein said means for avoiding reflection of sunlight from said screen is a sheet of opaque material having holes therein.

7. Apparatus in accordance with claim 6 wherein said mirror is a polished steel plate.

8. Apparatus in accordance with claim 7 wherein said light source is a laser.

* * * * *